United States Patent Office 3,467,453
Patented Sept. 16, 1969

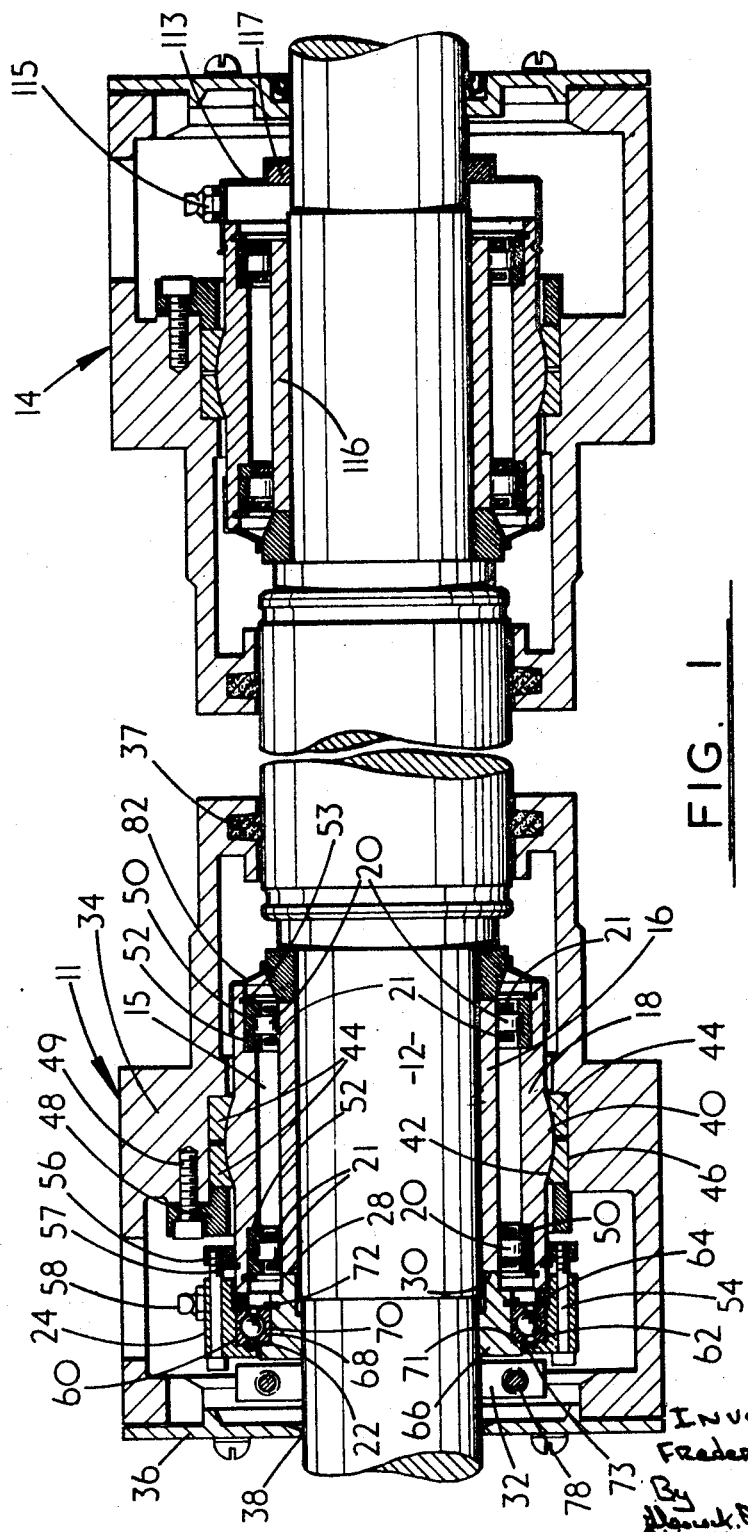

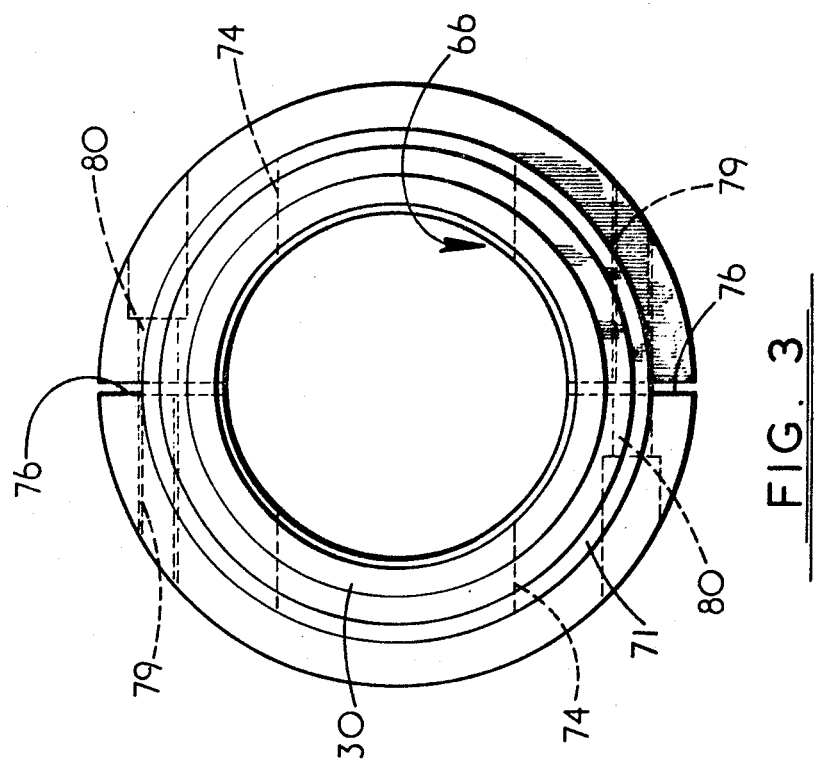
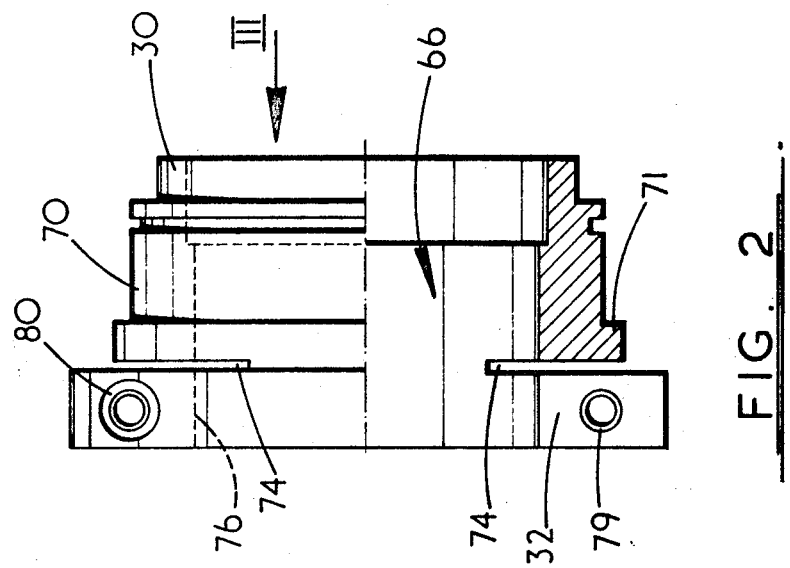

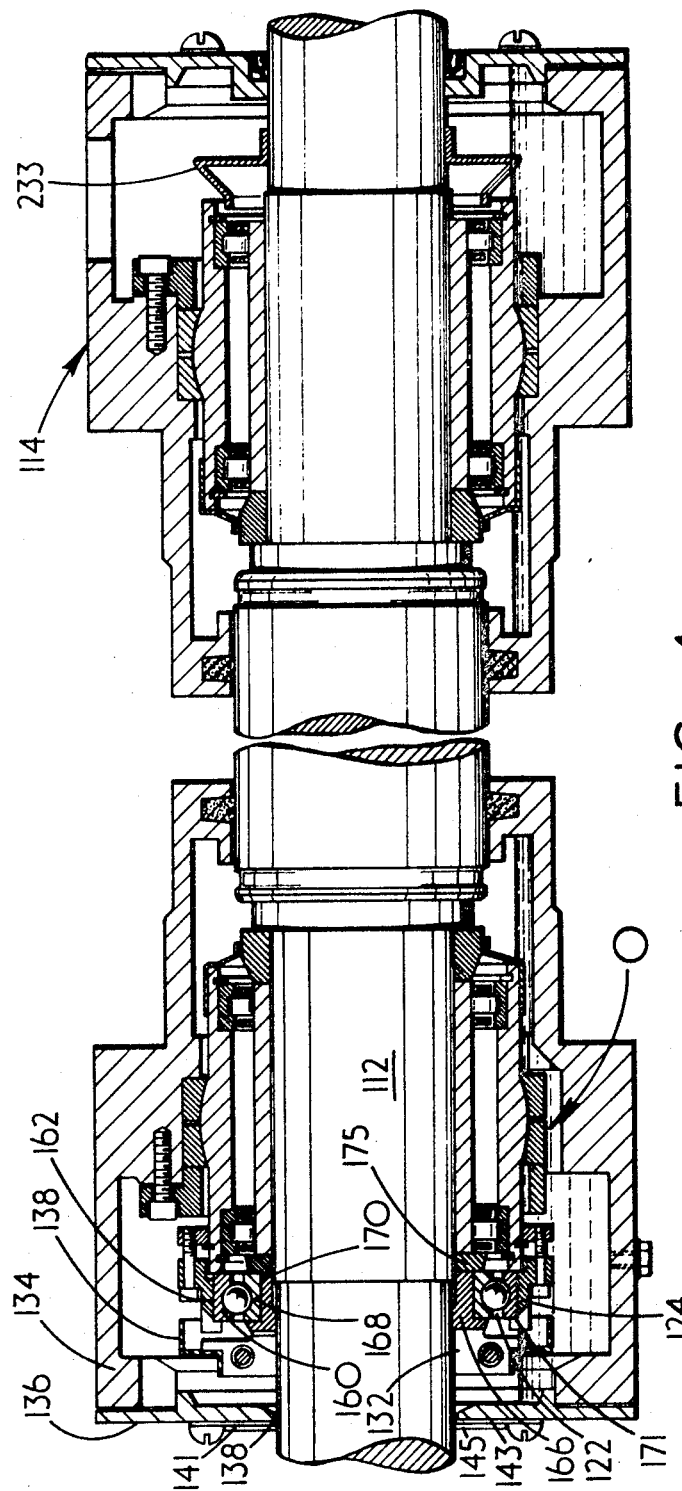

3,467,453
BEARINGS
Frederick Spencer, Cheadle Heath, Stockport, and Reginald Winstone Jones, Sale, England, assignors to Henry Simon Limited, Stockport, and The Hoffmann Manufacturing Company Limited, Chelmsford, England, both British companies
Filed Oct. 18, 1967, Ser. No. 676,131
Claims priority, application Great Britain, Oct. 22, 1966, 47,460/66
Int. Cl. F16c 19/04, 19/10, 19/14
U.S. Cl. 308—174                                          2 Claims

ABSTRACT OF THE DISCLOSURE

A journal bearing arrangement for the shaft of a rollermill grinding roll wherein the shaft is supported by a pair of bearings each having two sets of rollers spaced apart and retained in an outer assembly axially slidable along an inner race fixed to the shaft, the inner race surface between the roller tracks providing a co-axial journal surface for supporting the shaft during machining, and at one of the bearings a co-axial ball-bearing with its outer race fixed to the slidable assembly and its inner race fixable to the shaft, characterised in that supporting members of the outer assemblies are extended to enclose parts of the shaft and are provided with closure plates to constitute lubricant retaining housings.

---

This invention relates to the journal bearings of the grinding rolls of rollermills which are used for the grinding of cereals, soap products and other materials wherein the uniformity of particle size of very small particles is of paramount importance, and is an improvement in, or modification of, the invention of patent specification No. 3,033,621 wherein means are provided whereby during manufacture or subsequent reconditioning, the grinding roll shaft may be carried in machining journals in such manner as to ensure that the finished grinding surface of the roll will be perfectly co-axial with the operational journal surfaces.

The arrangement described in the aforesaid patent specification provides a journal bearing for the grinding roll of a roller mill in which the roller mill shaft is carried at each end in a journal unit which comprises a bearing of the type in which two sets of rollers (each of which may be of the single or double row type) are retained in an outer race or races which space the roller apart whilst the assembly comprising rollers, outer races and housing, is free to slide along a tubular inner race secured to the shaft and prividing roller tracks for the rollers, characterised in that the tubular inner race of one assembly is axially extended beyond the outer end of the roller tracks to provide a perfectly co-axial seating surface to support an axially adjustable tubular carrier of the inner race of a ball bearing, whose outer race is in fixed axial association with the aforesaid assembly the said adjustable tubular carrier being fixable to the shaft to locate it and the assembly axially in respect of the grinding roll, so that when such carrier is freed the assembly can be slid off its shaft, and the surfaces of the tubular inner race between and beyond the roller tracks thereon can serve as journal surfaces in a machine tool when the grinding surface of the roll is to be machined.

It is a disadvantage of the arrangement described, that where it is required to employ bearings wherein the two rows of rollers are spaced relatively widely apart so as to provide that the inner race surface between the roller tracks affords a single relatively wide machining journal surface which is co-axial with the said roller tracks the provision of extensions of the inner race outside the roller tracks adds unduly to the axial length of the bearing.

The object of the present invention is to mitigate this disadvantage.

The invention provides a journal bearing arrangement for a grinding roll of a rollermill, wherein each end of the shaft of the grinding roll is carried in a journal unit which comprises a bearing of the type wherein two sets of rollers with their cages are retained in outer races that are spaced apart and are located in a housing having a part-spherical part on the outer surface thereof which part seats in a spherical seating of a supporting member surrounding the housing and adapted to support it from the framework of the rollermill, the said supporting member, housing, outer races and sets of rollers constituting an assembly that is free to slide axially along a tubular inner race secured to the said shaft and providing roller tracks for the said sets of rollers which tracks have between them a surface of the inner race which is perfectly co-axial with the said roller tracks so that it may serve as a journal surface in a machine tool on which the grinding surface of the grinding roll has to be machined, and there being in association with one of the said assemblies, a ball-bearing located co-axially with the roller bearing which ball-bearing has its outer race fixed to the said housing and its inner race fixedly mounted on a tubular carrier which is co-axial with the said shaft and is provided with clamping means whereby it can be clamped to the shaft so as to locate it in relation to the said journal unit, characterised in that the said supporting member at each end of the shaft is extended to surround the position wherein such a tubular carrier could be accommodated and a part of the shaft at each end of the said journal unit and is provided with a closure plate, the said supporting member and its closure plate comprising a lubricant retaining housing.

Two embodiments of the invention will now be described with reference by way of example to the accompanying drawings, in which:

FIGURE 1 is a cross-sectional side view of the journal bearing arrangement embodying the invention, FIGURE 2 is an enlarged view partly in cross-section of a part of the bearing assembly, FIGURE 3 is an end view of the part shown in FIG. 2 as viewed in direction of arrow III, and FIGURE 4 is a cross-sectional side view of an alternative journal bearing arrangement embodying the invention.

In the journal bearing arrangement shown in FIG. 1, the journal unit which embodies the invention is indicated by the numeral 11 and mounts for rotation one end portion of a shaft 12 the other end portion of which is mounted for rotation by the journal unit 14. A grinding roll (not shown) of a rollermill is mounted on the shaft 12 between the end portions thereof.

The journal unit 11 comprises a roller bearing 15 having an inner race 16 which is firmly secured around the shaft 12, and an outer race housing 18 surrounding the inner race 16 which housing retains, in axially spaced relationship, two sets of rollers 20 with their cages 21 and outer races 50 which outer races are secured in annular recesses 52 of the said housing by circlips 53 to provide an outer assembly which is axially slidable relative to the said inner race. The journal unit 11 also comprises a deep-grooved ball-bearing 22 located co-axially with the said roller bearing on the side thereof which is remote from the grinding roll, the outer race 60 of the said ball-bearing being fixedly mounted in an annular recess 62 of a locating ring 24 which is fixed by clamping screws 54 to a clamp ring 56 that surrounds an end of the said outer race housing 18 and is held against leftward (FIG. 1) movement by circlip 57, there being between the adjacent end faces of the said outer race and housing 18 a spacing ring 64, having therein an opening communicating with a channel (not shown) of the said locating ring leading from grease nipple 58 whereby lubricating grease is fed to the said ball and roller bearings, to be retained therein by sealing ring 82. The inner race 68 of the ball-bearing 22 is mounted on a seating 70 of a tubular carrier 66 which is adapted to slide on the said shaft 12, the said seating 70 being co-axial with the bore of the said tubular carrier, and the said inner race 68 being axially trapped between a shoulder 71 of the tubular carrier and circlip 72. The peripheral surface of the shoulder 71, in conjunction with an annular extension 73 of the locating ring 24, forms a baffle to prevent the free escape of grease lubricant from the ball-bearing. The said tubular carrier 66 is provided with a co-axial extension 30 the axial face of which is in abutment with the end face 28 of the roller bearing inner race 16.

As can best be seen in FIGS. 2 and 3 the said tubular carrier has, at the end remote from the extension 30, an integral clamp extension 32 which is rendered effective by upper and lower transverse slots 74 and upper and lower longitudinal slots 76, there being two holes 77 for clamping screws 78 (see FIG. 1) which pass through the said clamp extension at right-angles to the slots 76, one end 79 of each of the said holes being in screw-thread engagement with the said screws, and the other end 80 being counterbored to clear the screw head. Tightening the said clamping screws causes the clamp extension of the tubular carrier to grip the shaft and locate it axially with respect to the said slidable assembly.

The journal unit 11 also comprises an enclosure housing 34 secured by bolts to a frame (not shown) of the rollermill, which enclosure housing has an end closure 36 having an opening 38 through which the outer end of the grinding roll shaft passes, the other end of the housing having a sealing ring 37 which engages an inner peripheral surface of the shaft. Mounted in an annular recess 46 of the said housing, and clamped therein by a ring member 48 that is locked to the housing by screws 49, is a pair of rings 44 which together provide an internal part-spherical seating surface 42 for a mating spherically surfaced annular extension 40 of the said outer race housing 18, the extension 40 and the rings 44 providing a self-aligning device of known type for the aforesaid roller bearing assembly, rotation of the outer race housing 18 of which is restrained by friction at the said mating spherical surfaces, the arrangement providing that the said housing 34 and its associated fixed parts are integral elements of the said axially slidable assembly.

The journal unit 14 corresponds in construction and arrangement to journal unit 11 in many respects but does not embody a ball-bearing with its associated locating ring and tubular carrier, there being in place thereof a grease retaining cap 113 supporting a sealing ring 117 and a grease nipple 115.

When it is required to remove the shaft 12 and its grinding roll from the rollermill in order to re-machine the grinding surface, the end cap 36 of the housing 34 is removed and the clamping screws 78 of the tubular carrier 66 are slackened off to free the shaft from its axial restraint. Then, with the weight of the grinding roll supported by slings or other suitable means, the bolts which secure the journal unit enclosure housings 34 to the frame of the rollermill are removed and the complete journal units are slid axially towards the respective ends of the shaft and disengaged therefrom. The shaft with its grinding roll is then lifted clear of the rollermill and mounted in the appropriate machine tool so as to be journal supported at the central surface areas of the inner races 16 and 116.

The alternative journal bearing arrangement, FIG. 4, corresponds in construction, arrangement and mode of operation to the arrangement of FIG. 1, and is described in so far as it differs therefrom.

The alternative arrangement, which is adapted for lubrication by oil instead of grease, serves to support for rotation a shaft 112, the journal unit that embodies the invention being indicated by the numeral 111 which supports one end of the shaft, the other end being supported by the journal unit 114. The journal unit 111, comprising an enclosure housing 134 which in a lower portion contains a quantity of oil O, is basically similar to the journal unit 11 of FIG. 1, but in this arrangement the outer race 160 of the deep-grooved ball-bearing 122 is fixedly mounted in an annular recess 162 of the locating ring 124 in such manner that the adjacent end faces of the said outer race and the outer race housing of the roller bearing are in direct abutment, the inner race 168 of the said ball-bearing being mounted on a seating 170 of a tubular carrier 166 adapted to slide or be clamped on the said shaft 112, the said seating being co-axial with the bore of the said tubular carrier and the said inner race 168 being axially trapped between a shoulder 171 of the tubular carrier and a spacing ring 175 which abuts the adjacent end face of the inner race of the roller bearing. The integral clamp extension 132 of the tubular carrier supports an annular sling-ring 133 to carry oil to upper portions of the bearing assembly when the said tubular carrier is rotating with the said shaft. The enclosure housing 134 has an end closure 136 having an opening 138 through which the shaft passes, escape of oil through the said opening being prevented by a sealing asembly 141 comprising a sealing ring 143 of resilient material and a retaining ring 145 overlaying the sealing ring 143.

The journal unit 114 corresponds in construction and arrangement to journal unit 111 but does not embody a ball-bearing with its associated locating ring and tubular carrier, there being in place thereof an annular sling-ring 233 which is clamped to the shaft and is adapted to carry oil to the roller bearing assembly.

When it is required to remove the shaft from the rollermill, the oil is first drained out of the enclosure housings by removal of suitable plugs, and thereafter the end closures of both housings are removed and the tubular carrier of the ball-bearing of journal unit 111 is freed from the shaft and the sling-ring of the journal unit 114 is removed before the complete journal units are slid along the shaft and disengaged therefrom.

What is claimed is:

1. A journal bearing arrangement for the grinding roll of a rollermill wherein each end of the shaft of the grinding roll is carried in a journal unit which comprises a bearing of the type wherein two sets of rollers with their cages are retained in outer races that are spaced apart and are located in a housing having a part-spherical part on the outer surface thereof which part seats in a spherical seating of a supporting member surrounding the housing and adapted to support it from the framework of the rollermill, the said supporting member, housing, outer races and sets of rollers constituting an assembly that is free to slide axially along a tubular inner race secured to the said shaft and providing roller tracks for the said sets of rollers which tracks have between them a surface of the inner race which is perfectly co-axial with the said roller tracks so that it may serve as a journal surface in a machine tool on which the grinding surface of the grinding roll has to be machined, and there being in association with one of the said assemblies, a ball-bearing located co-axially with the roller bearing which ball-bearing has its outer race fixed to the said housing and its inner race fixedly mounted on a tubular carrier which is co-axial with the said shaft and is provided with clamping means whereby it can be clamped to the shaft so as to locate it in relation to the said journal unit, characterised in that the said supporting member at each end of the shaft is extended to surround the position wherein such a tubular carrier could be accommodated and a part of the shaft at each end of the said journal unit and is provided with a closure plate, the said supporting member and its closure plate comprising a lubricant retaining housing.

2. A journal bearing arrangement for the grinding roll of a rollermill as claimed in claim 1, wherein the aforesaid tubular carrier has its end face which is remote from its clamping means in direct or indirect abutment with the adjacent end face of the said inner race of the roller bearing.

References Cited

UNITED STATES PATENTS

| 1,377,670 | 5/1921 | Dallimore | 308—176 |
| 2,597,516 | 5/1952 | Noe | 308—176 |
| 3,033,621 | 5/1962 | Spencer et al. | 308—207 |

MARTIN P. SCHWADRON, Primary Examiner

FRANK SUSKO, Assistant Examiner

U.S. Cl. X.R.

308—207